US011835267B2

United States Patent
Byström

(10) Patent No.: US 11,835,267 B2
(45) Date of Patent: Dec. 5, 2023

(54) METHOD AND ARRANGEMENT FOR VERIFYING REFLECTOR SURFACES OF PARABOLIC TROUGH SOLAR COLLECTORS

(71) Applicant: ABSOLICON SOLAR COLLECTOR AB, Härnösand (SE)

(72) Inventor: Joakim Byström, Härnösand (SE)

(73) Assignee: ABSOLICON SOLAR COLLECTOR AB, Härnösand (SE)

(*) Notice: Subject to any disclaimer, the term of this patent is extended or adjusted under 35 U.S.C. 154(b) by 639 days.

(21) Appl. No.: 17/045,396

(22) PCT Filed: Apr. 8, 2019

(86) PCT No.: PCT/SE2019/050325
§ 371 (c)(1),
(2) Date: Oct. 5, 2020

(87) PCT Pub. No.: WO2019/194741
PCT Pub. Date: Oct. 10, 2019

(65) Prior Publication Data
US 2021/0156595 A1 May 27, 2021

(30) Foreign Application Priority Data
Apr. 7, 2018 (SE) .................... 1850391-2

(51) Int. Cl.
F24S 40/90 (2018.01)
G06T 7/73 (2017.01)
F24S 23/74 (2018.01)
F24S 50/00 (2018.01)
(Continued)

(52) U.S. Cl.
CPC ............... *F24S 40/90* (2018.05); *F24S 23/74* (2018.05); *F24S 50/00* (2018.05); *G01B 11/00* (2013.01);
(Continued)

(58) Field of Classification Search
CPC . F24S 40/90; F24S 23/74; F24S 50/00; G06T 7/74; G06T 7/001; G01B 11/00
(Continued)

(56) References Cited

U.S. PATENT DOCUMENTS 7,667,833 B1* 2/2010 Diver .................. F24S 50/80
356/138
8,327,838 B1 12/2012 Ochadlick
(Continued)

FOREIGN PATENT DOCUMENTS

CN 107843207 A 3/2018
DE 102011080969 A1 2/2013
(Continued)

OTHER PUBLICATIONS

Francini, et al.; "Evaluation of Surface Slope Irregularity i Linear Parabolic Solar Collectors"; International Journal of Photoenergy, vol. 127, No. 8; Jan. 1, 2021; pp. 1-6.
(Continued)

Primary Examiner — Vivek K Shirsat
(74) Attorney, Agent, or Firm — PATENT PORTFOLIO BUILDERS PLLC

(57) ABSTRACT

A method of determining a reflector parameter of a concentrating solar collector's reflector surface. An image is captured of the reflected receiver tube in the reflector surface, with an image capturing device, e.g. a camera, and processed to put together image data related to the reflected receiver tube. Further, the method comprises determining a location of the image capturing device at a capturing time of the captured image, and determining a position on the reflector surface based on the determined location of the image capturing device and the image data. The method comprises also calculating the reflector parameter at the determined position based on the image data. By numeric
(Continued)

calculation of reflector parameters, such as slope, defects, e.g. caused by impacts or material imperfections, may be identified at an early stage before installing the solar collectors, which may reduce service needs.

20 Claims, 9 Drawing Sheets

(51) Int. Cl.
  *G01B 11/00* (2006.01)
  *G06T 7/00* (2017.01)
(52) U.S. Cl.
  CPC .............. *G06T 7/001* (2013.01); *G06T 7/74* (2017.01); *G06T 2207/20221* (2013.01); *G06T 2207/30164* (2013.01); *G06T 2207/30244* (2013.01)
(58) Field of Classification Search
  USPC ........................................................ 126/600
  See application file for complete search history.

(56) References Cited

U.S. PATENT DOCUMENTS

2008/0030521 A1  2/2008  Fang
2014/0071439 A1  3/2014  Pedretti-Rodi

FOREIGN PATENT DOCUMENTS

EP    1717568 A2    11/2006
EP    2579017 A1     4/2013

OTHER PUBLICATIONS

Supplementary European Search Report in corresponding/related European Application No. EP 19 78 1311 dated Mar. 16, 2021; 2 pages.

Ulmer, et al.; "Measurement Techniques for the Optical Quality Assessment of Parabolic Trough Collector Fields in Commercial Solar Power Plants"; Proceedings of ASME 2007 Energy Sustainability Conference; Jan. 1, 2007; pp. 0. 1-7.

International Search Report/Written Opinion dated Jun. 7, 2019 in related/corresponding PCT Application No. PCT/SE2019/05032.

Richard B. Diver et al., "Practical Field Alignment of Parabolic Trough Solar Concentrators", Journal of Solar Energy Engineering, May 2007, pp. 153-159, vol. 129.

Examination Report in corresponding/related European Application No. 19781311.6 dated Sep. 20, 2023.

* cited by examiner

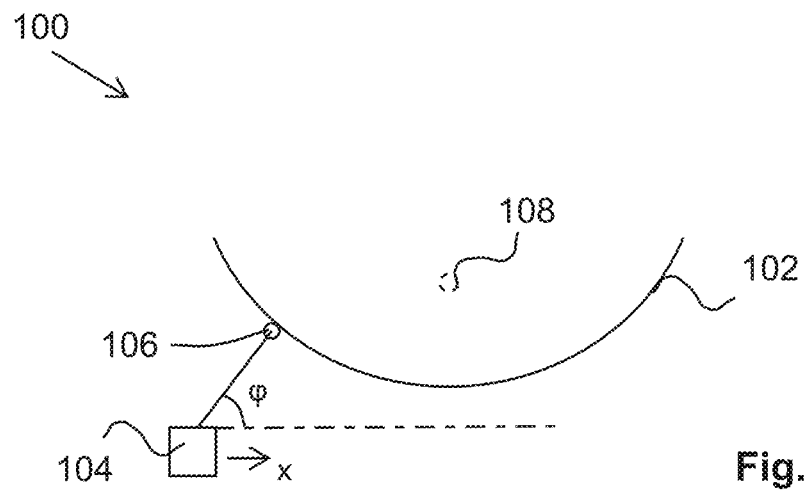
Fig. 1a (existing art)
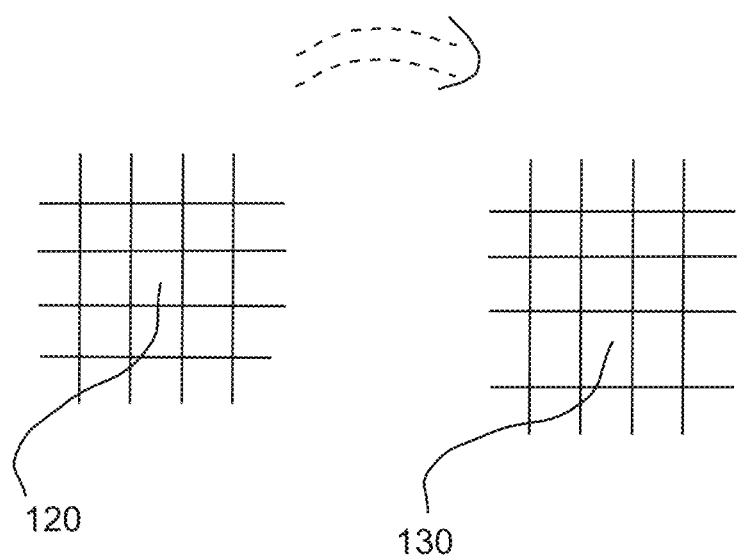
Fig. 1b (Existing art)

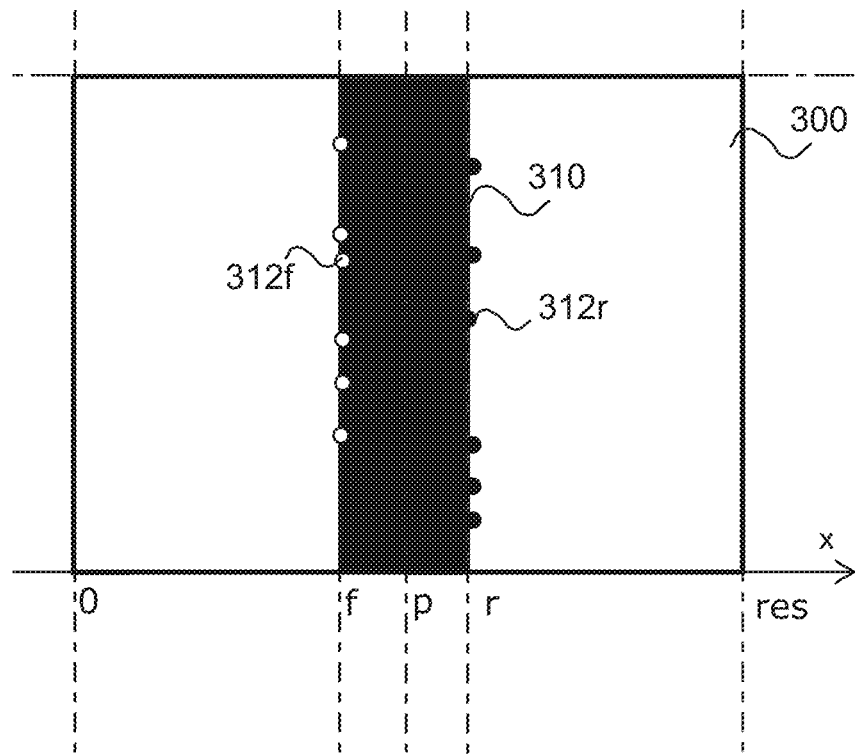
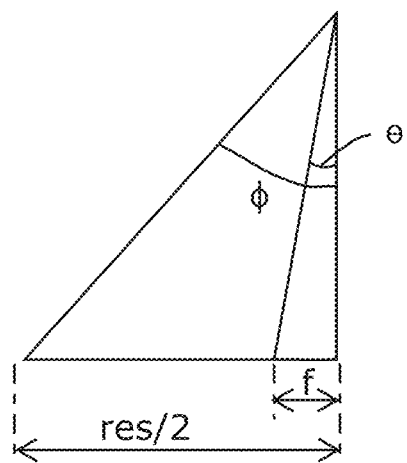
Fig. 3

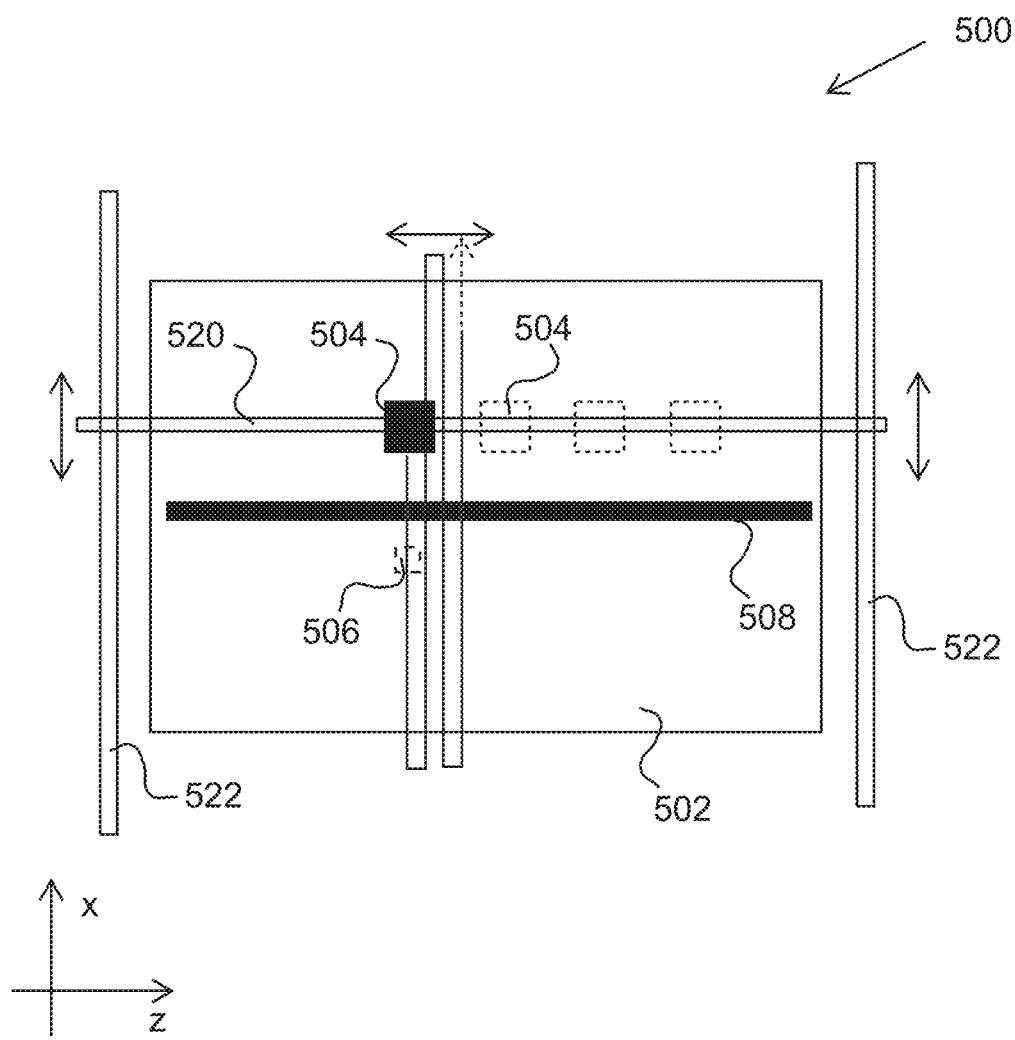
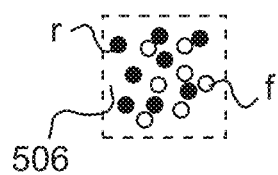
Fig. 5a

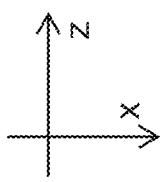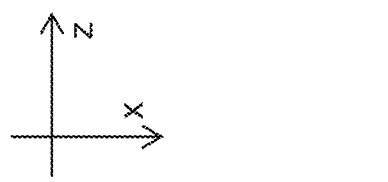

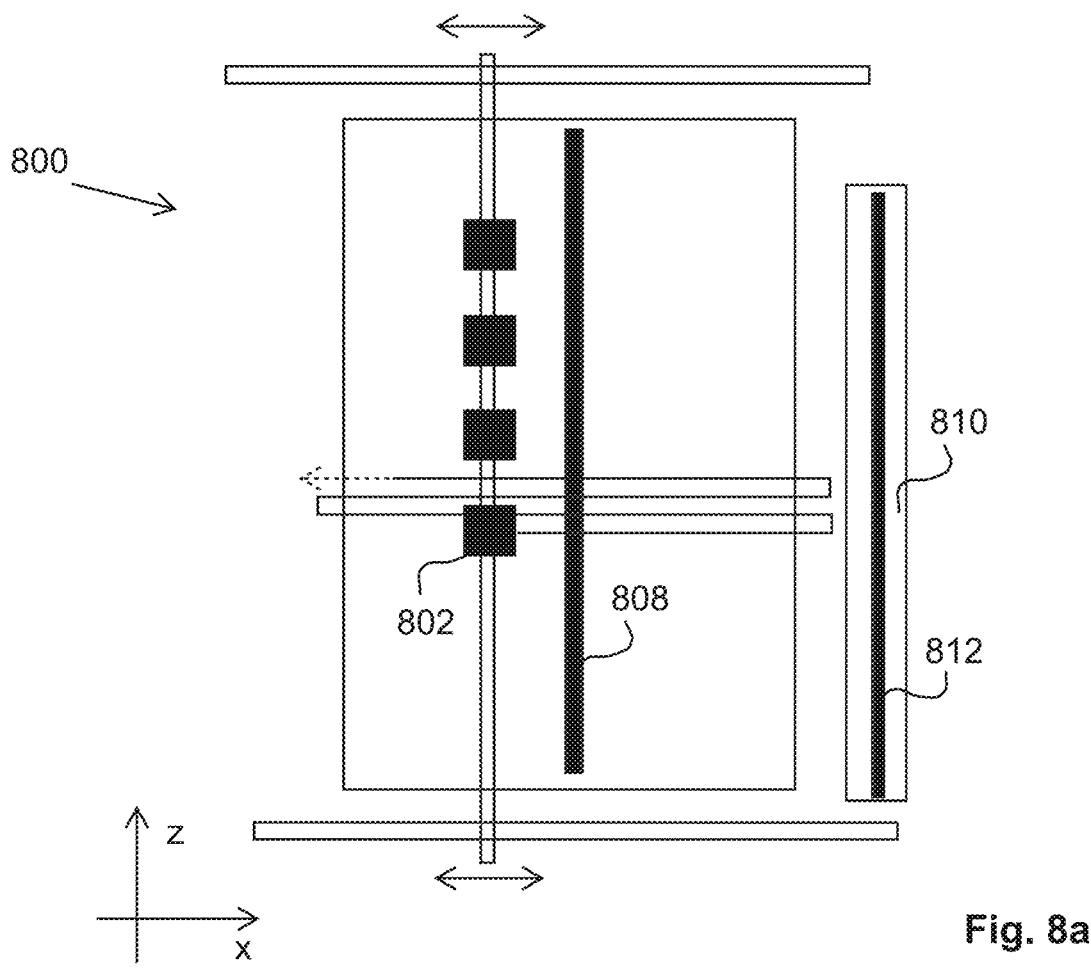
Fig. 8a
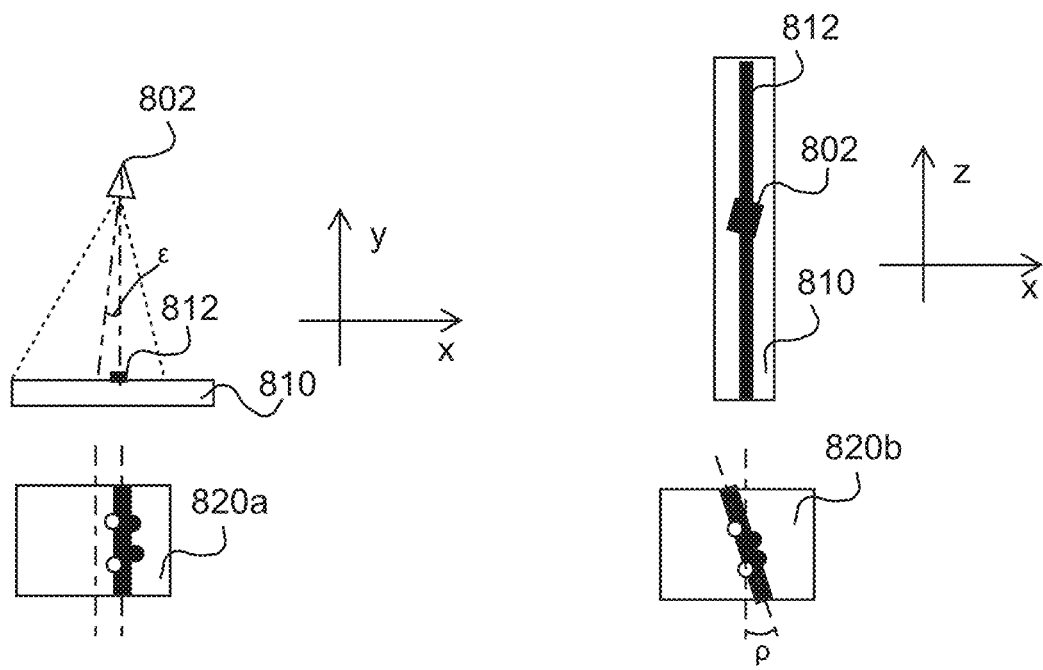
Fig. 8b
Fig. 8c

METHOD AND ARRANGEMENT FOR VERIFYING REFLECTOR SURFACES OF PARABOLIC TROUGH SOLAR COLLECTORS

TECHNICAL FIELD

This disclosure relates to energy supply, especially to an arrangement for quality verification of reflectors for thermal solar energy collectors.

BACKGROUND

In modern society energy is consumed by people and industries, e.g. for producing various products, for transport and production of food. Energy could be produced in several forms and from different energy sources. For instance, electricity is often produced from hydroelectric power plants, combustion of coal, oil, or gas. Traditionally, heat has been produced from local combustion or district heating power plants.

With an increasing population and demands for services, energy consumption strongly increases which negatively affects our environment significantly in a negative way. Combustion produces large amount of carbon dioxide and other greenhouse gases. Hydroelectric power plants require large territories to be drowned, etc.

In order to reduce our footprint and negative impression on our environment, demands have been raised for more clean and environmental friendly energy production. Today, renewable energy is produced from wind, sun, ocean waves, etc. The sun provides large amounts of energy to our planet in form of radiated sun beams. Solar radiation can be used by solar cells to generate electricity, e.g. in form of solar panels, or by solar collectors to generate thermal heat.

A concentrating solar collector uses mirrors, lenses, or combinations thereof, to focus the solar radiation in form of a point or a line. In trough-formed concentrating solar collectors a reflector is formed as a curved elongated mirror, which reflects the solar radiation on a receiver arranged along a focus-line of the reflector. The receiver is commonly a black tube filled with a transport fluid, such as water, glycol, or oil. The tube is heated by the concentrated solar radiation and the heat is transferred to the transport fluid that is circulated in a system where the hot transport fluid could be used. The heated transport fluid may be used both as process heat in industrial processes as in district heating.

The term "PTC" (Parabolic Trough solar Collector) will be used in this disclosure to denote a concentrating solar collector with a trough-formed reflector arranged to concentrate solar light onto a fluid tube. Typically, PTCs will be pivoted to track the sun during the day. They will then be controlled by a solar tracking arrangement.

A parabolic trough solar collector comprises an elongated reflector, which reflective surface in a cross-section describes a parabolic curve. The reflector focuses direct sunlight on a focus. In mathematical terms, such parabola has the properties "curve", "focus", "Latus rectum", and "optical axis of symmetry". The parabolic through's "optical plane of symmetry" is defined by extending the parabolas axis of symmetry along the longitudinal direction of the trough.

It is important that the reflector has an appropriate shape in order ensure that reflected sunlight hits the receiver. Therefore, different methods for verifying the reflector shape are practiced. Two common methods for verifying shapes of reflectors will now be explained.

With reference to FIG. 1a, which is a schematic illustration in a perspective view, an arrangement 100 for verifying shape of a parabolic trough reflector 102 will now be described, according to an example.

When forming the parabolic trough reflector 102, a metal sheet is formed to apply a parabolic shaped cross-section in an x,y-plane, with a propagation in z-direction (in this figure into the paper). The concave side of the reflector 102 is provided with a reflective layer to reflect direct sunlight onto a receiver tube 108 to be mounted along a focus line of the reflector 102. The receiver tube 108 propagates in the z-direction too. The arrangement 100 comprises a measurement unit 104 which is equipped with a spring-loaded mechanic sensor 106. When the measurement unit 104 travels across the reflector in the x-direction, the sensor 106 follows the convex side of the reflector 102 and the angle $\varphi$ varies. The varying angle $\varphi$ is then analysed to determine the curvature, i.e. the shape, of the reflector 102. Thus, the curvature is determined based on the varying angle $\varphi$ and the movement in x-direction. Based on the determined curvature, the reflector 102 will then either be approved or refused.

With reference to FIG. 1b, which is a schematic illustration, another method for verifying a shape of a parabolic reflector trough will now be described according to an example.

A parabolic trough reflector corresponding to the one illustrated in FIG. 1a, is to be verified. An illumination source (not shown), e.g. a laser source or a lamp projects a pattern 120 on the concave side of the trough reflector. Due to the curvature of the trough reflector, the pattern will be skewed while being observed at the trough's concave surface. In this example the light source projects a symmetric pattern 120 of equidistant lines in two dimensions, an image of the skewed pattern 130 is captured with a camera. Finally, the curvature of the parabolic trough reflector is calculated based on the captured skewed pattern 130. The calculated curvature of the reflector could then be applied as a basis for a decision whether the reflector will be approved or refused.

It is a challenge to achieve more efficient and appropriate methods for verifying precision of reflectors' shape.

BRIEF DESCRIPTION OF DRAWINGS

The solution will now be described in more detail by means of exemplifying embodiments and with reference to the accompanying drawings, in which:

FIGS. 1a-b are schematic illustrations of arrangements for verifying a parabolic shape in accordance with existing art.

FIG. 3 is a schematic illustration of principles for verifying a reflector, according to possible embodiments.

FIG. 5a-c are schematic views and examples of output from a verifying arrangement according to possible embodiments.

FIGS. 8a-c are schematic views of a verifying arrangement according to possible embodiments.

SUMMARY

Figure 2A:
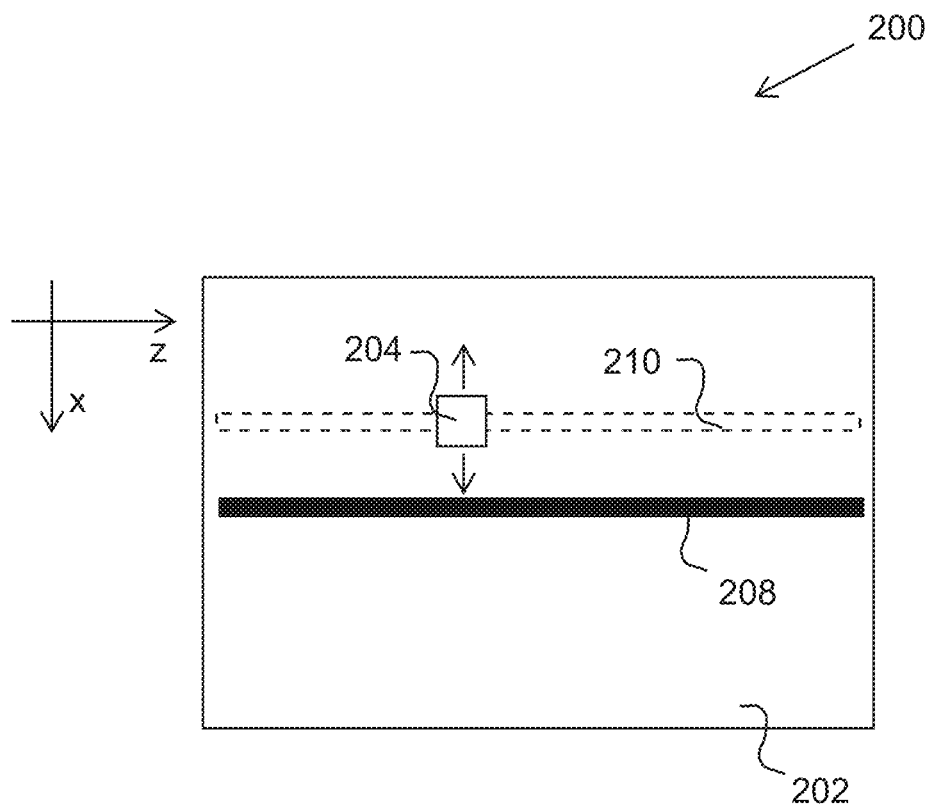
FIGS. 2a-b are schematic illustrations of an arrangement for verifying a reflector, according to possible embodiments.

It would be desirable to improve precision when verifying performance of solar collectors. It is an object of this disclosure to address at least one of the issues outlined above.

Further there is an object to provide a mechanism that enables verification of reflector parameters of solar collectors at positions of their reflector surfaces.

These objects may be met by an arrangement and a method according to the attached independent claims.

According to a first aspect, a method is provided for determining a reflector parameter of a concentrating solar collector's reflector surface, e.g. slope. The method comprises capturing an image of the reflected receiver tube in the reflector surface, with an image capturing device, e.g. a camera, and processing the captured image to put together image data related to the reflected receiver tube. Further, the method comprises determining a location of the image capturing device at a capturing time of the captured image, and determining a position on the reflector surface based on the determined location of the image capturing device and the image data. The method comprises also calculating the reflector parameter at the determined position based on the image data.

Furthermore, processing the captured image may comprise detecting an edge of the reflected receiver tube in the captured image and putting together the image data to represent the detected edge. Determining the position on the reflector surface may be performed based on the detected edge, and calculating the reflector parameter at the determined position on the reflector surface may be performed based on the detected edge.

Moreover, two opposite edges may be detected, and calculation of the reflector parameter may be based on both the opposite edges.

According to a second aspect, an arrangement is provided for determining a reflector parameter of a concentrating solar collector's reflector surface, the concentrating solar collector having a receiver tube arranged at the reflector surface's focus. The arrangement comprises an image capturing device configured to capture an image of the reflected receiver tube in the reflector surface, and process the captured image to put together image data related to the reflected receiver tube. The arrangement also comprises a location control unit configured to determine a location of the image capturing device at a capturing time of the captured image, and a processing unit configured to determine a position on the reflector surface based on the determined location of the image capturing device and the image data, and calculate the reflector parameter at the determined position based on the image data.

Furthermore, the arrangement may comprise a reference object, and be configured to determine an angular error of the image capturing device's focus direction. The arrangement may be configured to capture a reference image of the reference object with the image capturing device located at a reference location, the reference object comprising an elongated structure, and detect a reference edge of the elongated structure in the reference image with the image capturing device. The arrangement may be configured to calculate the angular error based on the detected reference edge and the reference location, with the processing unit, such that the calculated angular error may be compensated for when calculating the reflector parameter with the processing unit. The arrangement may be configured to determine and compensate for angular errors of the focus direction and/or a twist about the focus direction.

One advantage of the methods and arrangements of the embodiments defined in this description is that such defects may be identified at an early stage before installing the PTCs, which may reduce service needs. Another advantage is that disturbances in the manufacturing process may be effectively identified. Thereby, the risk of manufacturing large numbers of defective PTCs decreases, which is cost-efficient.

DETAILED DESCRIPTION

Even though camera-based solutions have been applied earlier for adjusting reflector facets of concentrating solar collectors, e.g. described in the patent publication U.S. Pat. No. 7,667,833 B1, these solutions are based on comparisons between theoretical and photograph images. The proposed solution of this disclosure is instead directed towards calculation of reflector parameters based on identified characteristic points and require no such comparison between images. One advantage is that because calculations for some characteristic points require less processor capacity than comparison of images the number of points to be analysed may increase. Another consequence of the limited data to be used is that calculations of reflector parameters may be conducted as a quality control and be applied as a basis for approval/rejection of a reflectors in industrial manufacturing.

Thus, when prior art solutions merely are focused on adjusting partial reflector facets at installations, the proposed solution can instead enable an accurate and precise quality control of solar collectors before delivery to customers.

With the methods and arrangements of this disclosure, characterizing points originating from two different positions at the reflector surface could be identified from one captured image, which may achieve improved precision and/or effectiveness when determining appropriate reflector parameters.

Figure 2B:
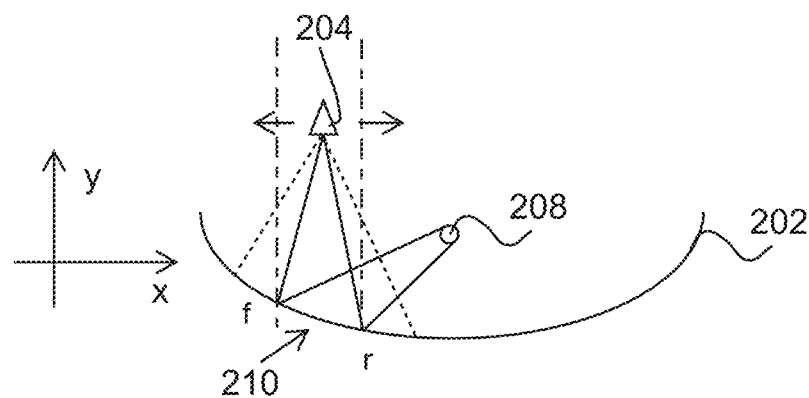

With reference to FIGS. 2a and 2b, which are schematic views, an arrangement 200 for verifying a shape of a reflector 202 will now be described in accordance with one exemplifying embodiment.

A PTC (Parabolic Trough solar Collector) (not referred to) comprises the reflector 202 which is formed as a parabolic trough with a cross-section according to a parabolic function $y=x^2$. The reflector 202 propagates in z-direction. In the focus of the reflector 202, a receiver tube 208 is arranged in which a transport fluid flows when the PTC is in service. When the reflector 202 is well manufactured, its appropriate shape and reflective surface achieves that the solar radiation is reflected and hits the receiver tube 208 concentrated. Radiation that miss the receiver tube 208 causes decreased heat output and efficiency of the PTC. Therefore, it is important to verify that the reflector's 202 shape, i.e. its curvature, has a high precision.

The arrangement for verifying the reflector 202 shape comprises a camera 204, which is an image capturing device arranged to swipe over the reflector 202 in along an x-axis. The camera's 204 focus is directed downwards into the reflector 202, i.e. along a y-axis as seen in FIG. 2b. During the swiping movement, the camera 204 captures images. The images will show a reflection 210 of the receiver tube 208.

The beam paths for the edges of the reflector tube 208 are illustrated in FIG. 2b as solid lines and the edges of the reflector tube 208 are reflected at the positions f, r at the reflector 202. As seen in FIG. 2b, a first edge is reflected at a front position f, and a second edge is reflected at a rear position r. In FIG. 2b, the camera's 204 field of view is illustrated as dotted lines. The dash-dotted vertical lines illustrate that the front position f is located before the camera 204 and the rear position r is located after the camera 204 when the camera sweeps to the left in FIG. 2b. When the camera 204 sweeps to the right in FIG. 2b, the positions are opposite.

With reference to FIG. 3, which is a schematic illustration, some principles for enabling calculation of a reflector's slope will now be described in accordance with one exemplifying embodiment.

A captured image 300 is illustrated and a reflection 310 of a receiver tube is present in the image 300. The front edge f of the receiver tube and the rear edge r of the receiver tube are seen in the captured image 300. By analysing the captured image 300, the positions f, r of the receiver tube's reflected edges f, r at the reflector could be determined. The field of view angle $\phi$ of the camera is known and is used as a for calculating the deviation $\theta$ for the beam path with respect to the vertical focus direction of the camera that captured the image 300. Before the deviation $\theta$ for the beam path is calculated, an image value of the edge's representation f is calculated. In this embodiment the edge's representation f is calculated as a mean value of a plurality of detected image points 312f representing the edge of the receiver tube in the captured image 300 to improve measurement accuracy without limitation thereto.

From the image's resolution, e.g. 640×480 pixels, the calculated representation f, and the field of view angle $\phi$ of the camera, the deviation $\theta$ is calculated by trigonometry. The deviation $\theta$ may then be made as input when calculating slopes of the reflectors, which will be defined below in conjunction the embodiment to be described in conjunction with FIG. 4a.

Some image points 312r representing the other edge of the reflected 310 receiver is shown. With corresponding calculation performed for the image points 312r, the deviation $\theta$ to be applied for the embodiment to be described in conjunction with FIG. 4b, could be calculated.

With reference to the FIGS. 4a-c, which are schematic views, some principles for determining a slope of a parabolic reflector surface 402 will now be described in accordance with exemplifying embodiments.

Figure 4A:
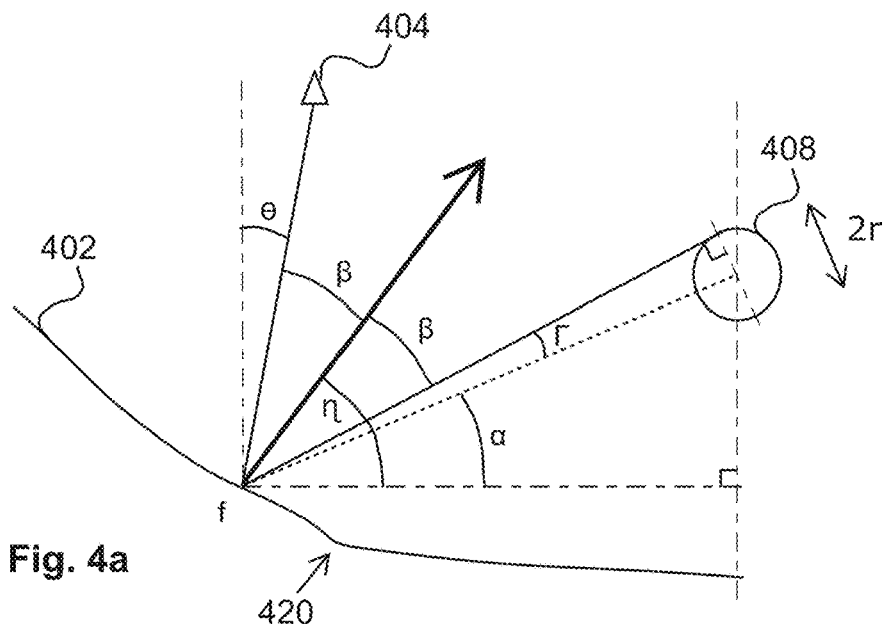
FIG. 4a-c are schematic illustrations of principles for verifying a reflector, according to possible embodiments.

In FIG. 4a, determination of the reflector 402 surface's slope at a position f is illustrated. The camera 404 moves to the left in the figure and the upper edge of the receiver tube 408 is reflected at the position f, i.e. the position f is positioned in front of the travelling camera 404. The beam path between the upper edge of the receiver tube 408 and the camera 404 is illustrated by a solid line.

In the FIG. 4a some illustrative help-lines are drawn as dash-dotted to facilitate understanding of the principles for determination of the slope of the reflector 402 at position f A vertical dash-dotted line is drawn through the position f, and another dash-dotted line illustrates the reflector's 402 optical axis of symmetry, i.e. through the receiver tube 408 and the reflector 402 bottom. A horizontal dash-dotted line is drawn between the position f and the optical axis of symmetry. A dotted line is drawn from the position f through the centre of the receiver tube 408.

The slope $\eta$ of the reflector 402 at the position f is defined by the reflector's 402 normal in that position. From the captured image and the camera 404 location at the capturing time of the image, the position f has been calculated. The position f is defined by a coordinate pair in an x,y-space.

As seen in FIG. 4a, the sum of $\theta+2\beta+\Gamma+\alpha=\pi 2$, where the angle $\theta$ e was calculated from the captured image and the camera location at the capturing time as described with reference to FIG. 3. Calculations of the angles $\alpha$ and $\Gamma$ are made based on basic trigonometry for right triangles, where the radius r of the receiver tube 408 and the receiver tube's location at the focus of the reflector 402 are known. As a result, the angle $\beta=(\pi/2-\alpha-\theta-\Gamma)/2$. Then the slope $\eta$ is calculated as $\eta=\alpha+\beta+\Gamma$. The calculated slope $\eta$ could then be compared with an optimal slope for the position f to determine a slope error of the reflector 402 at position f.

The slope $\eta$ may also be determined by instead detecting a lower edge, of the receiver tube 408 in the captured image and calculating the slope at a position r rear the moving camera 404. The principles are similar, but the calculations are to be modified, as will be described in accordance with FIG. 4b.

Figure 4B:
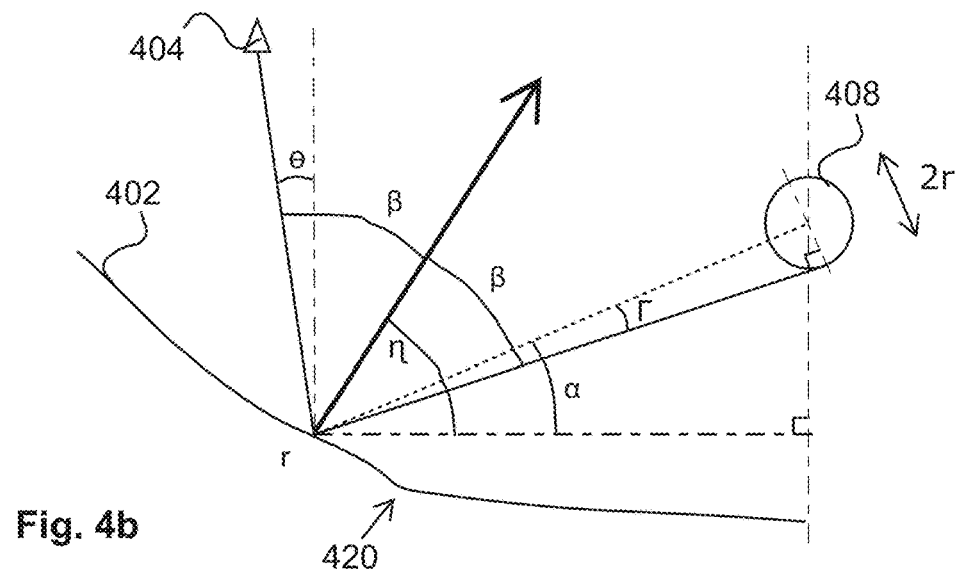

Also in the FIG. 4b some illustrative help-lines are drawn as dash-dotted to facilitate understanding of the principles for determination of the reflector's slope. A vertical dash-dotted line is drawn through the position r, and another dash-dotted line illustrates the reflector's 402 optical axis of symmetry, i.e. through the receiver tube 408 and the reflector 402 bottom. A horizontal dash-dotted line is drawn between the position r and the optical axis of symmetry. A dotted line is drawn from the position r through the centre of the receiver tube 408.

The slope $\eta$ of the reflector 402 at the position r is defined by the reflector's 402 normal in that position. From the captured image and the camera 404 location at the capturing time of the image, the position r has been calculated. The position r is defined by a coordinate pair in an x,y-space.

As seen in FIG. 4b, the sum of $2\beta+\alpha-\Gamma-\theta=\pi/2$. The angle $\theta$ was calculated from the captured image and the camera location at the capturing time of the image. Calculations of the angles $\alpha$ and $\Gamma$ are made based on basic trigonometry for right triangles, where the radius r of the receiver tube 408 and the receiver tube's location at the focus of the reflector 402 are known. As a result, the angle $\beta=(\pi/2-\alpha+\theta+\Gamma)/2$. Then the slope $\eta$ is calculated as $\eta=\alpha+\beta-\Gamma$. The calculated slope $\eta$ could then be compared with an optimal slope of the reflector 402 at the position r to determine a slope error of the reflector.

Both the FIGS. 4a and 4b shows that the reflector 402 has a defect in form of a buckle at the position 420. At the position, i.e. locally about the position 420, the reflector's 402 slope varies due to the defect. Defects may originate from various manufacturing and logistic processes due to various reasons, e.g. material imperfections, impacts or other damages, bad laminating process, etc. One advantage of the methods and arrangements of the embodiments defined in this description is that such defects may be identified at an early stage before installing the PTCs, which may reduce service needs. Another advantage is that disturbances in the manufacturing process may be identified, to avoid manufacturing large number of defective PTCs, which is cost-efficient.

The FIGS. 4a and 4b illustrate calculations of slopes for positions f, r when the camera 404 has moved between two locations such that the positions f and r coincide. By performing calculations of slopes $\eta$ for coinciding positions f, r from images captured at two different camera locations, further measurements could be taken into account when verifying a reflector 402 surface. Thereby improved appropriateness could be achieved when verifying the reflector surface. In addition, calculating the slope $\eta$ from images captured from different camera locations and for different edges of the receiver tube 408 may further improve appropriateness and make the determination less sensitive to interferences, e.g. from ambient light, etc.

Alternatively, the verification may instead be faster performed by for each captured image determining slopes η both for a front position f and a rear position r, i.e. a position of the reflector 402 may be verified as either a front position for a rear position r that do not coincide. Thereby, the slopes do not have to be calculated twice which decreases the time for verifying a position on the reflector surface.

Thus, according to the disclosed arrangements and methods both front positions f and rear positions r for the sweeping camera can determined from one captured image and have the appropriate reflector parameter determined for these front f and rear r positions. The camera travels in the x-direction when sweeping across the reflector. Thereby, the reflector parameters may be determined fast and effective.

Alternatively, further images may be used for calculating the reflector parameter for one physical position. When a front position f originating from one image coincides with a rear position from a further image, both the front position f and the rear position r may have the reflector parameter determined according to their respective formulas. Thereby the reflector parameter may be determined with higher precision. It is to be noted that the image and the further image do not have to be captured directly after each other and that intermediate images may be captured therebetween. As long as coinciding front and rear r positions could be determined for two respective images, the later of them will be referred to as the "further image", and be captured with the camera at a succeeding location.

The FIGS. 4a and 4b illustrate how slopes η at one and the same point are determined from images captured from two different camera locations.

Figure 4C:
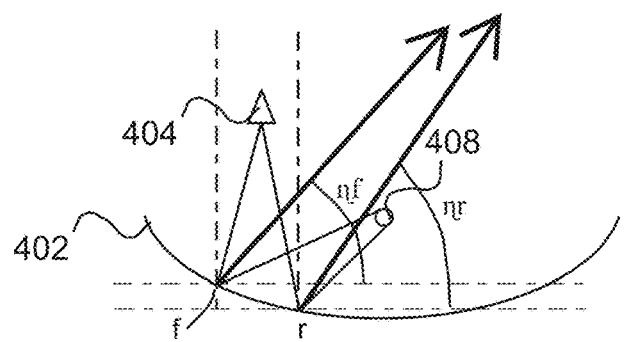

FIG. 4c, which also is a schematic cross-sectional view across a reflector 402, illustrates a situation where two different slopes $\eta_f$, $\eta_r$ are determined simultaneously from one image captured with a camera 404 at one and the same location. The determination of the slope $\eta_f$ for the position f is performed as described in accordance with the embodiments referring to FIG. 4a, and determination of the slope $\eta_r$ for the position r is performed as described in accordance with the embodiments referring to FIG. 4b. FIG. 4c illustrates the difference in slopes $\eta_f$, $\eta_r$ at two different positions at the reflector 402.

With reference to FIG. 5a, which is a schematic view, an arrangement 500 for verifying a curvature of a reflector 502 surface of a PTC will now be described in accordance with one exemplifying embodiment.

In this embodiment and on other instances in this description, the different terms "location" and "position" have been applied to distinguish between points in space for image capturing devices and points at the reflector surface, respectively. Location will denote a spatial location of an image capturing device, i.e. camera etc., when position, instead will denote a physical position on a reflector surface.

Correspondingly, as in some above described embodiments the PTC comprises a reflector 502 and a receiver tube 508. The arrangement 500 comprises a camera 504 which is arranged to sweep over the trough-formed reflector 502, i.e. along the x-axis in FIG. 5. The camera 504 is mounted on a beam 520 which moves along a pair of supporting beams 522. When performing the sweeping movement, the camera 504 captures images which are analysed to detect edges of the receiver tube's 508 reflection (hidden behind the beam in FIG. 5a) at the reflector 502 surface in the captured images. The camera 504 detects both edge positions positioned before the camera 504 edge positions positioned and after the camera 504 when sweeping, i.e. both front positions f and rear positions r as described above in conjunction with another exemplifying embodiment. However, the inventive concept is not limited to detection of edges at both front and rear positions. It is understood that the camera 504 may be modified to detect alternative detectable characteristics in the captured image, either in front of the camera 504 or after the camera 504, when sweeping.

When the camera 504 has crossed the reflector 502, it returns back to proceed capturing images. In this embodiment the returning movement is performed with an offset in z-direction and the camera 504 captures images also on its way back. The offset in z-direction is selected such that images of two adjacent sweeps partly overlap each other.

Slopes are calculated for positions f, r at the reflector 502 surface corresponding to detected edges in captured images, i.e. front positions f and rear positions r from one or more captured images. In this embodiment, calculation of slope is performed for each front position f and rear position r in partial surfaces of the reflector 502 surface, without being limited thereto. In the detailed view a projection 506 of one partial surface at the PTC's aperture is shown. From the projection 506, a plurality of front positions f (white dots) and rear positions r (black dots) at the partial surface are determined and calculation of their respective slopes is performed. Thereby, for each partial surface, a mean value of its slope could be calculated and applied as basis when verifying the slope in that partial surface. The ideal slope of the partial surface could be determined based on the reflector's 502 parabolic function $y=x^2$ for an appropriate position within the partial surface.

Two measurement parameters which affects the appropriateness in determination of slope are image capturing frequency and size of partial surfaces. An image capturing frequency of 10-20 fps (frames per second) together with a partial surface which projection 506 on the reflector's aperture of about 2×2 cm has shown to be suitable, to achieve an appropriate balance between detail and required processing capacity for calculation, without being limited to these selected measurement parameters. The size of the partial surfaces of the reflector 502 surface variates due to the curvature of the reflector 502.

As an example, for a reflector of 5.5 m×1.1 m, a projection 506 on the reflectors aperture of 2×2 cm results in about 13700 partial surfaces for which both front positions f and rear positions r are calculated. The amount of positions f, r for one partial surface depends on the edge detections from the captured images and varies between 0-150, with an average of about 40-60 positions f, r, for the partial surfaces. An image capturing frequency of about 10-20 fps results in between 18400 and 36800 images for the reflector 502.

Spatial offset of the camera 504 in z-direction is another measurement parameter which may be adjusted to decrease the time for verifying a reflector 502. For the above described example, a spatial offset of 6 cm achieves a reliable overlap between images of two adjacent sweeps, without limitation thereto.

As indicated in FIG. 5a by dotted lines, a plurality of cameras 504 may be arranged beside each other on the beam 520 to simultaneously capture images of respective sections of the reflector 202 surface, which decreases the time for verifying a reflector 202 and improves efficiency.

Regarding the above described exemplifying embodiments, the inventive concept should not be interpreted to be limited to the exemplified appropriate measurement parameters, which are merely given as appropriate implementations. It is to be understood that the measurement parameters may be varied to suitable values when putting the disclosed concept into practice.

With reference to the FIGS. 5b and 5c, which are two schematic matrixes, some results of a verifying process of a reflector will now be described in accordance with exemplifying embodiments. The results may be achieved with the arrangement 500 described above with reference to FIG. 5a.

Both matrixes illustrate projections 506 of partial surfaces of a reflector 502 as referred to in FIG. 5a. In both the figures measurement values of, 11*14 projections are present as a non-limiting example. In practice, for a 5.5*1.1 m large aperture the number of projections 506 is about 275*55.

In FIG. 5b, each cell or matrix element of the matrix represents a projection 506 of a partial surface of the reflector surface. The value within a matrix element or cell is a mean value of calculated angular deviations from their respective optimal slopes at positions within the partial surface. The values of the matrix elements or cells are indications of the quality of the reflector's partial surfaces, and could be applied for approving or refusing the partial surfaces when verifying.

Moreover, angular deviations of columns or rows in the matrix may alternatively be summarized to be applied as basis for approval or refusal of columns and rows of partial surfaces. Thereby, a less complex and faster verifying process could be achieved, still with high precision.

Thus, the calculated results can be numerically presented in a matrix or table where each matrix element is representing a partial surface of the reflector surface, or with a heatmap where a colour used to denote the calculated deviation for each position of the reflector surface. Comparing numerical values is a fast and efficient process to achieve a reliable verification with high precision with limited process capacity.

FIG. 5c, is similar to FIG. 5b, but the matrix elements describe the quality of the measurements for the partial surfaces. When there is more than one measured point at a specified position, a number describing the quality of the measurement may be calculated e.g. the error in one standard deviation, and presented similar to the calculated result e.g. matrix, table or heatmap.

Figure 6:
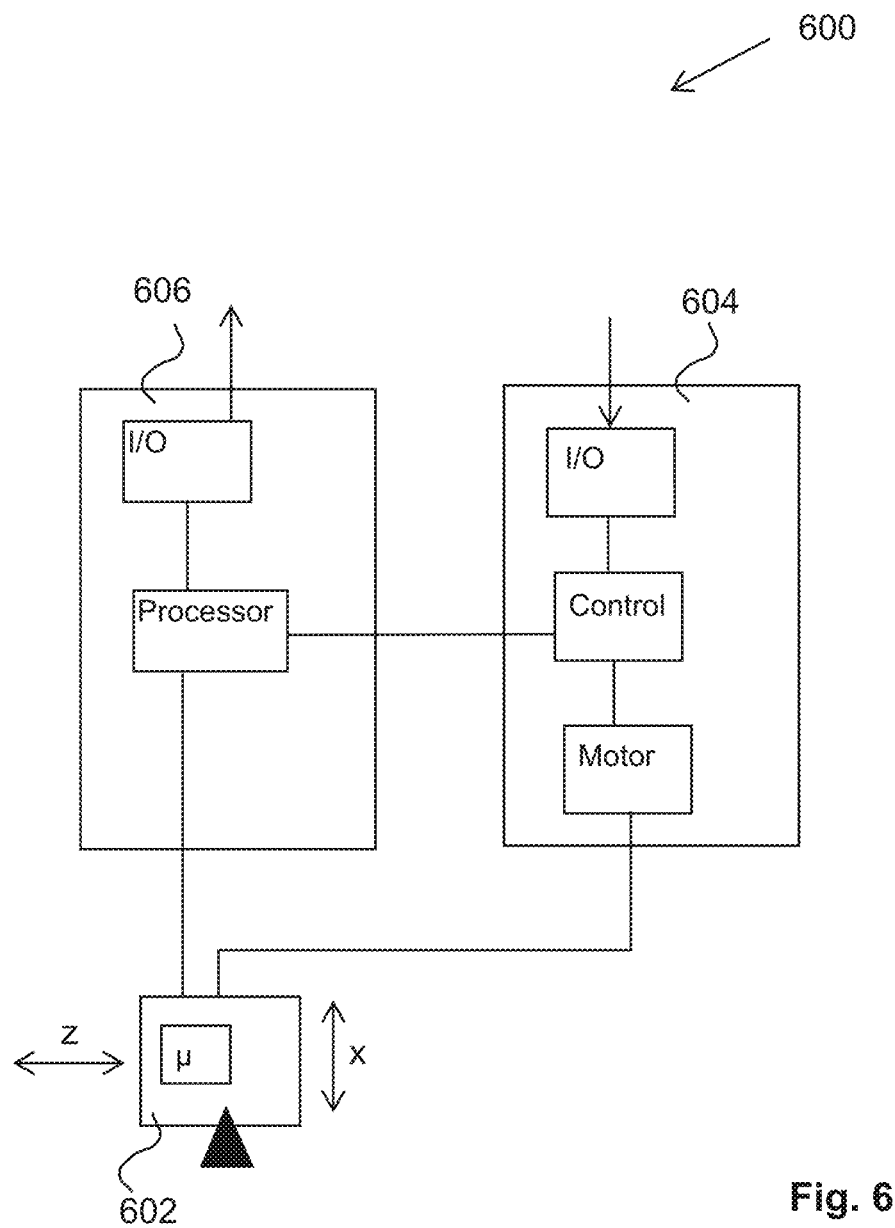
FIG. 6 is a schematic block diagram of a verifying arrangement according to possible embodiments.

With reference to FIG. 6, which is a schematic block diagram, an arrangement 600 for determining a reflector parameter of a concentrating solar collector's reflector surface will now be described in accordance with one exemplifying embodiment. The concentrating solar collector has a receiver tube arranged at the reflector surface's focus.

The arrangement for determining 600 the reflector parameter comprises an image capturing device 602, a location control unit 604, and a processing unit 606.

The image capturing device 602 is configured to capture images of the receiver tube reflected in the reflector surface and put together image data related to the reflected receiver tube. In this embodiment the image capturing device 602 detects edges of the reflected receiver in the captured images and puts together datasets comprising image coordinates of the detected edges and the capturing times and sends to the processing unit 606. In this embodiment, the image capturing device 602 is equipped with a single card computer µ to implement functionality for edge detection and for sending the datasets to the processing unit 606. A dataset may comprise the best identified nine points corresponding to the upper edge of the receiver tube and nine points corresponding to the lower edge of the receiver, together with the image's capturing time.

The image points corresponding to upper and lower edges represent front and rear positions at the reflector surface as defined above in conjunction with some other embodiments.

It is to be notified that the functionality for edge detection and for sending the datasets to the processing unit 606, may be alternatively implemented, e.g. as a separate processor and an interface unit, without deviating from the disclosed inventive concept.

On beneficial effect of implementing functionality for detecting the characteristic features, e.g. edges, and putting together the dataset distributed in the cameras is that the processing unit 606 does not have to handle or process huge amounts of image data in form of high-resolution images. Instead only the characteristic points must be transmitted to the processing unit 606 and be handled there. The saved processing capacity of the processing unit 606 may be spent on handling further images, which may speed up a monitoring process for quality control.

The location control unit 604 is configured to move the image capturing device over the reflector surface when capturing images. The location control unit 604 comprises a motor, e.g. a servo-motor, a control circuit, e.g. a programmable logic controller, and an interface "I/O", e.g. a human machine interface. The motor moves the image capturing device 602 in response to control signals received from the control circuit, in accordance with instructions received from the interface, i.e. along the x-axis while sweeping across the reflector surface, and an offset along the z-axis when before starting next sweep. The location control unit 604 provides the control signals also to the processing unit 606 to be applied as a basis for determining the locations of the image capturing device 602 when capturing images.

The processing unit 606 is configured to determine the locations of the image capturing device 602 according to the control signals mentioned above. The processing unit 606 is also configured to receive the data sets from the image capturing device 602. By the received data sets and determined locations, the processing unit 606 is configured to determine positions at the reflector surface, e.g. front positions for rear positions r in accordance with above described embodiments and calculate slopes for the reflector at these positions f, r. The processing unit 606 comprises a processor and an interface "I/O". The processor is configured to perform the calculations of slopes and determine whether a reflector will be approved or refused. The interface is configured to communicate with the image capturing device 602, but also to present the result of verifications of the reflector.

The processing unit 606 may determine two positions, i.e. both a front position f and a rear position r, from the same captured image, and may determine the reflector parameter at both the positions, as indicated in other embodiments above. In addition, positions from images and further images may be used when determining the reflector parameter, e.g. one rear position from a first image together with a front position from a subsequent second image. When using multiple images, the first image is captured with the camera at a first location, and the second image (i.e. the further image) is captured with the camera at a second location, i.e. a succeeding location.

In another exemplifying embodiment, which is based on the above described one, the arrangement 600 for determining a reflector parameter may be further configured to determine angular errors of the image capturing device 602, as will be further discussed with reference to the FIGS. 8a-c. The arrangements 600 for determining a reflector parameter descried above may be implemented as a final step in a robotized production line for manufacturing PTCs (Parabolic Trough solar Collectors) for verification of reflector surfaces. The result of the verifying process may then be applied as a quality check for either approving or refusing the reflectors before delivery to end users. A potential refusal of a reflector may be an indication of that some previous step in the production line has been affected by various disturbances and has to be adjusted. It is of importance and cost effective to identify disturbed or defective production steps such that appropriate adjustments may be made at an early stage in order to prevent manufacturing of further refused PTCs.

Figure 7:
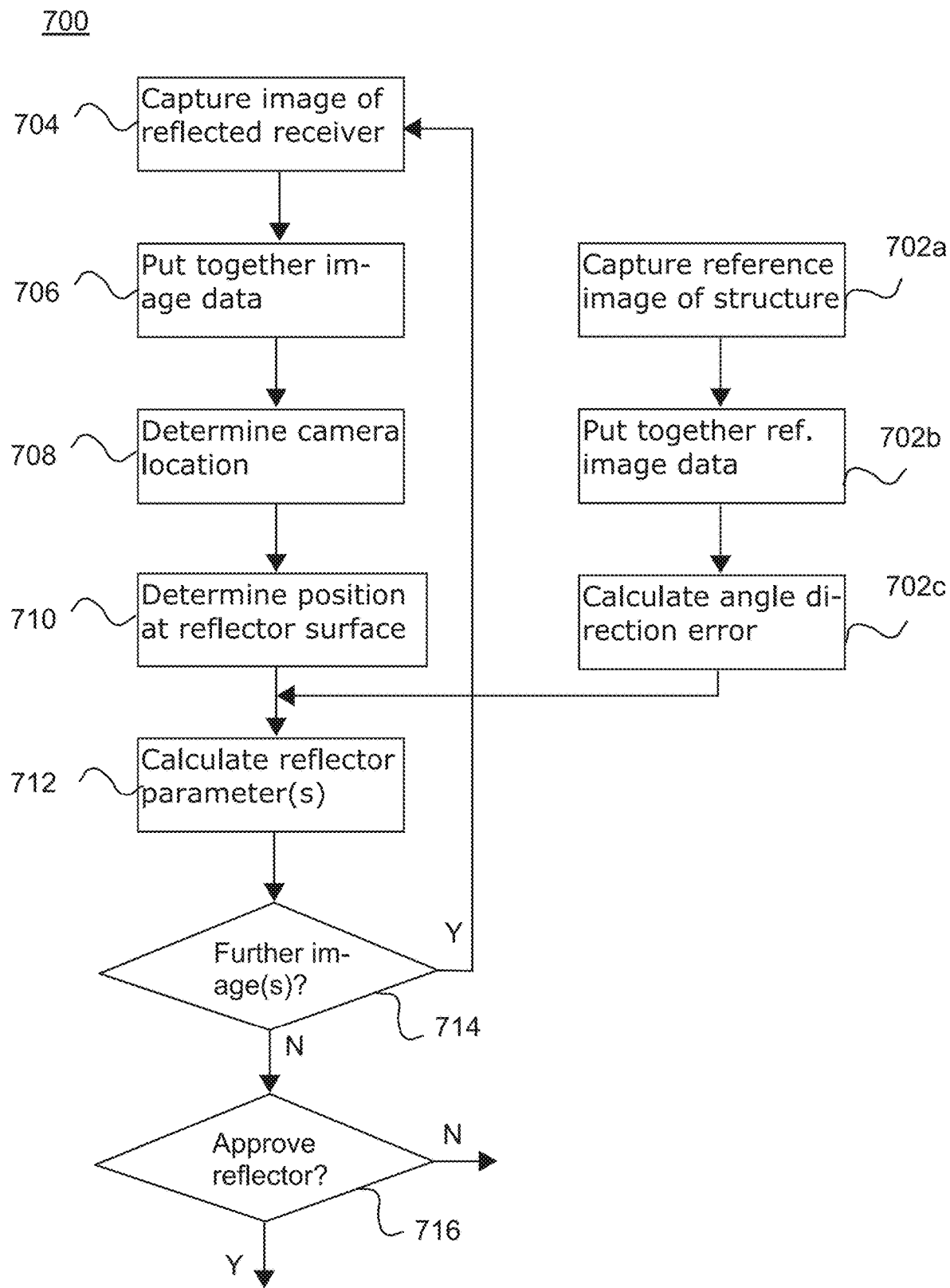
FIG. 7 is a schematic flow chart of a verifying method according to possible embodiments.

With reference to FIG. 7, which is a schematic flow chart, a method 700 for determining a reflector parameter of a concentrating solar collector reflector's surface will now be described, according to one exemplifying embodiment. The solar collector has a receiver tube arranged at a focus-line of the reflector. The method is performed by a measuring arrangement with a movable camera which sweeps over the reflector surface and is controlled by a processing unit. Such a measuring arrangement is typically implemented as a robot, which sweeps a camera over the reflector surface, and is described in other embodiments of this disclosure and with reference to other figures.

In this embodiment, the reflector parameter is the slope of the reflector surface at a position on the reflector surface, however, the inventive concept is not limited to slopes specific, and may as an alternative be adapted to determination of other appropriate alternative reflector parameters.

In an initial action 704, an image of the reflector surface is captured with a camera, i.e. an image capturing device. The image is captured when the camera is directed into the reflector and the receiver tube is reflected in the reflector surface. I.e. the camera captures an image of the reflector surface with the receiver tube reflected therein, which results in an image of the reflected receiver tube.

In a subsequent action 706, image data that are related to the captured image are put together. For instance, for the captured image a number of image points that fulfils a specific condition are put together in a dataset. In this embodiment putting together the image data comprises detecting the receiver tube's edges in the captured image and selecting a plurality of image points representing the detected edges. In this embodiment, 9 image points of each edge are selected, and a centre-point is calculated from the 2×9 image points, which results in a dataset of 19 image points, together with the capturing time of the image.

The camera's location is determined in another action 708, and is determined from control signals applied for moving the camera over the reflector, i.e. controlling the sweeping movement transversal the reflector, x-direction, and an offset in the longitudinal direction along the reflector, z-direction. In service, the offset in z-direction may be selected such that images of two adjacent sweeps overlap each other in order to ensure that the reflector surface is reliably captured by the camera. The camera's spatial location when capturing the image is a parameter which will be applied for calculating the slope at a position on the reflector surface in another action 712.

In a subsequent action 710, the position on the reflector surface that corresponds to a detected edge point is determined. I.e. front positions f and/or rear positions r according to the above disclosed definitions, are calculated. Correspondingly as described above in conjunction with other embodiments, when making use of data originating from two images, the positions f, r, are determined from images captured at different locations. For instance, one image is captured with the camera located at one location, and the further image is captured with the camera at a succeeding location.

However, as will be described below in another related embodiment, the camera may be affected by various disturbances, and its focus direction may comprise an angular error. A method of determining such an angular error will also be described in a related exemplifying embodiment.

In a following action 712, the reflector surface's normal direction η is calculated. The calculations have already been described in conjunction with other embodiments and will therefore not be further discussed here.

Above, calculation of slope at one position at the reflector surface has been described. However, when verifying a reflector, the slope will be determined for the whole reflector surface.

Therefore, in another exemplifying embodiment which is based on the above described one, the camera moves to new locations and the method continues with repeating the actions 704-712 until slopes have been calculated for the complete reflector surface, as indicated in another action 714. As mentioned above, the camera moves in x-direction but is also moved with an offset in z-direction. It is also to be noted that a plurality of cameras may be arranged to decrease the time for covering the complete reflector surface, as earlier mentioned in this disclosure.

In a final action 716, the reflector surface may then be verified as either approved or refused. A decision regarding whether the reflector surface will be approved or refused may be made by taking the calculated slope for some positions or all positions into account. In addition, a negative decision may be a valuable indication that some previous step in a manufacturing process is disturbed or defect and has to be adjusted.

In another exemplifying embodiment, which may be based on some above described ones, the calculations of slope in action 712 will compensate for a bad directed camera. Some actions are there performed to determine an angular error of the camera.

In an action 702a, a reference image is captured of a reference object. In this embodiment the reference object comprises an elongated structure to simulate the reflected receiver tube. When capturing the reverence image, the camera is located at a known reference location. The action 702a corresponds to the action 704 but is performed for the elongated structure instead of the reflected receiver tube.

In a following action 702b, reference edges of the elongated structure are detected in the reference image and a dataset is put together. The dataset comprises image points of two opposite located reference edges. The action 702b corresponds to the action 706 but is performed for the elongated structure instead of the reflected receiver tube.

In a subsequent action 702c, an angular direction error is calculated based on the dataset. The calculated angular direction error could then be taken into account and be compensated for when calculating the reflector parameter, i.e. slope, in the action 712.

The principle of determining an angular error will be further disclosed below.

With reference to the FIGS. 8a-c, which are schematic views, an arrangement 800 for determining an angular error of a camera will now be described in accordance with one exemplifying embodiment.

An arrangement 800 for calculating slope of a reflector surface is shown and corresponds to the arrangement illustrated in FIG. 5a. Compared with the embodiment illustrated with reference to FIG. 5a, this arrangement 800 for calculating slope in addition comprises a reference object 810 which location is known. At the reference object 810 an elongated structure 812 is present which will simulate the reflection of the receiver tube at the reflector surface. The camera 802 is configured to be moved to a location above the reference object 810 and capture a reference image 820*a*, 820*b*. From the captured reference image 820*a*, 820*b* the camera 802 is configured to detect opposite reference edges and put together image data as described in action 702 of the embodiment described with reference to FIG. 7. The camera 802 is configured to send the image data as a dataset to a processing unit (not shown) to be used together with the location for calculating the angular error. From the received image data, i.e. the dataset representing the reference edges, the processing unit is configured to calculate angular errors ε, ρ of the camera 802. As illustrated in FIGS. 8*b* and 8*c*, both an offset and a twist of the camera's focusing direction could be detected by this arrangement. In FIG. 8*b*, the camera 802 is pivoted an ε about a z-axis, which results in that the elongated structure 810 appears to be shifted to the right in the captured reference image 820*a*. In the reference image 820*a*, some image points of reference edges are shown as white and black dots. These image points are applied for calculating the angle direction error ε.

FIG. 8*c* instead, illustrates that the camera 802 is pivoted an angle ρ about an y-axis, (out from the paper) which results in that the elongated structure 810 appears to be twisted in the reference image 820*b*. In practice disturbance may be a combination of these disturbances, and the arrangement 800 is configured calculate this combination from the detected image points.

In order to disclose the proposed solution, some Numbered Exemplifying Embodiments (NEEs) will now be given below.

NEE1. Method (700) of determining a reflector parameter of a concentrating solar collector's reflector surface, the concentrating solar collector having a receiver tube arranged at the reflector surface's focus, the method comprising:
capturing (704) an image of the reflected receiver tube in the reflector surface, with an image capturing device,
processing (706) the captured image to put together image data related to the reflected receiver tube,
determining (708) a location of the image capturing device at a capturing time of the captured image,
determining (710) a position (f, r) on the reflector surface based on the determined (708) location of the image capturing device and the image data, and
calculating (712) the reflector parameter at the determined (710) position (f, r) based on the image data.

NEE2. The method (700) according to NEE 1, wherein processing (706) the captured (704) image comprises detecting an edge of the reflected receiver tube in the captured (704) image and putting together the image data to represent the detected edge, wherein determining (710) the position (f, r) on the reflector surface is performed based on the detected edge, and wherein calculating (712) the reflector parameter at the determined position (f, r) on the reflector surface is performed based on the detected edge.

NEE3. The method (700) according to NEE 2, wherein processing (706) the captured (704) image comprises detecting two opposite edges of the reflected receiver tube in the captured (704) image and putting together the image data to represent both a first edge and a second edge of the two opposite edges, wherein a first position (f, r) on the reflector surface is determined (710) based on the first edge and a second position (f, r) on the reflector surface is determined (710) based on the second edge, and wherein calculating (712) the reflector parameter at the determined (710) position (f, r) on the reflector surface is performed based on the first edge detected in the captured (704) image and a second edge detected in a captured (704) further image.

NEE4. The method (700) according to NEE 2, wherein processing (706) the captured (704) image comprises detecting two opposite edges of the reflected receiver tube in the captured (704) image and putting together the image data to represent both a first edge and a second edge of the two opposite edges, wherein a first position (f, r) on the reflector surface is determined (710) based on the first edge and second position (f, r) on the reflector surface is determined (710) based on the second edge, and wherein calculating (712) the reflector parameter is performed simultaneously for the first position (f, r) and the second position (f, r) based on the first edge and the second edge, respectively, detected in the captured image.

NEE5. The method (700) according to any of the NEEs 2 to 4, further comprising verifying (716) a partial surface of the reflector surface based on the calculated reflector parameter at a plurality of determined (710) positions (f, r) within the partial surface.

NEE6. The method (700) according to any of NEEs 1 to 5, further comprising determining an angular error (ε, ρ) of the image capturing device's focus direction, wherein:
a reference image of a reference object is captured (702*a*) with the image capturing device located at a reference location, the reference object comprising an elongated structure,
a reference edge of the elongated structure is detected (702*b*) in the reference image, and
calculating (702*c*) the angular error (ε, ρ) based on the detected (702*b*) reference edge and the reference location,
wherein the calculated angular error (ε, ρ) is compensated for when calculating (710) the reflector parameter.

NEE7. The method (700) according to NEE 6, wherein the angular error (ε, ρ) relates to at least one of: a focus direction of the image capturing device, and a twist about the focus direction of the image capturing device.

NEE8. Arrangement (200, 500, 600, 800) for determining a reflector parameter of a concentrating solar collector's reflector surface, the concentrating solar collector having a receiver tube (208, 408, 508, 808) arranged at the reflector surface's focus, the arrangement (200, 500, 600, 800) comprising:
an image capturing device (204, 404, 504, 602, 802) configured to capture an image (300) of the reflected receiver tube (210) in the reflector surface, and process the captured image (300) to put together image data related to the reflected receiver tube (208, 408, 508, 808),
a location control unit (604) configured to determine a location of the image capturing device (204, 404, 504, 602, 802) at a capturing time of the captured image (300), and
a processing unit (606) configured to determine a position (f, r) on the reflector surface based on the determined location of the image capturing device (204, 404, 504, 602, 802) and the image data, and calculate the reflector parameter at the determined position (f, r) based on the image data.

NEE9. The arrangement (200, 500, 600, 800) according to NEE 8, wherein the image capturing device (204, 404, 504, 602, 802) is configured to process the captured image (300) by detecting an edge of the reflected receiver tube (210) in the captured image and put together the image data to represent the detected edge, and wherein the processing unit (606) is configured to determine the position (f, r) on the reflector surface based on the detected edge, and calculate the reflector parameter at the determined position (f, r) on the reflector surface based on the detected edge.

NEE10. The arrangement (200, 500, 600, 800) according to NEE 9, wherein the image capturing device (204, 404, 504, 602, 802) is configured to process the captured image by detecting two opposite edges of the reflected receiver tube (210) in the captured image (300) and put together the image data to represent both a first edge and a second edge of the two opposite edges,
wherein the processing unit (606) is configured to:
determine a first position (f, r) on the reflector surface based on the first edge,
determine a second position (f, r) on the reflector surface based on the second edge, and
calculate the reflector parameter at the determined position (f, r) on the reflector surface based on the first edge detected in the captured image (300) and a second edge detected in a captured further image (300).

NEE11. The arrangement (200, 500, 600, 800) according to NEE 9, wherein the image capturing device (204, 404, 504, 602, 802) is configured to process the captured image (300) by detecting two opposite edges of the reflected receiver tube (210) in the captured image and put together the image data to represent both a first edge and a second edge of the two opposite edges,
wherein the processing unit (606) is configured to:
determine a first position (f, r) on the reflector surface based on the first edge and
determine a second position (f, r) on the reflector surface based on the second edge and
calculate the reflector parameter simultaneously for the first position (f, r) and the second position (f, r) based on the first edge and the second edge, respectively, detected in the captured image (300).

NEE12. The arrangement (200, 500, 600, 800) according to any of the NEEs 8 to 11, wherein the processing unit (606) is configured to verify a partial surface of the reflector surface based on the calculated reflector parameter at a plurality of determined positions (f, r) within the partial surface.

NEE13. The arrangement (800) according to any of NEEs 8 to 12, further comprising a reference object (810), and further configured to determine an angular error (ε, ρ) of the image capturing device's (802) focus direction, by:
capturing a reference image of the reference object (810) with the image capturing device (802) located at a reference location, the reference object (810) comprising an elongated structure (812),
detecting a reference edge of the elongated structure (812) in the reference image with the image capturing device (802), and
calculating the angular error (ε, ρ) based on the detected reference edge and the reference location, with the processing unit (606),
such that the calculated angular error (ε, ρ) may be compensated for when calculating the reflector parameter with the processing unit (606).

NEE14. The arrangement (800) according to NEE 13, wherein the processing unit (606) is configured to calculate the angular error (ε, ρ) as relating to at least one of: a focus direction of the image capturing device (802), and a twist about the focus direction of the image capturing device (802).

Reference throughout the specification to "one embodiment" or "an embodiment" is used to mean that a particular feature, structure or characteristic described in connection with an embodiment is included in at least one embodiment.

Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps.

Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method of determining a reflector parameter of a concentrating solar collector's reflector surface, the concentrating solar collector having a receiver tube arranged at the reflector surface's focus, the method comprising:
capturing an image of the reflected receiver tube in the reflector surface, with an image capturing device,
processing the captured image to put together image data related to the reflected receiver tube,
determining a location of the image capturing device at a capturing time of the captured image,
determining two positions (f, r) on the reflector surface based on the determined location of the image capturing device and the image data put together, and
calculating the reflector parameter at each of the two determined positions (f, r) based on the image data,
wherein the reflector parameter is a slope of the reflector surface and the reflector surface is in one piece.

2. The method according to claim 1, wherein processing the captured image comprises detecting two opposite edges of the reflected receiver tube in the captured image and putting together the image data to represent the two detected opposite edges, wherein determining the two positions (f, r) on the reflector surface is performed based on the two detected opposite edges, and wherein calculating the reflector parameter at the two determined positions (f, r) on the reflector surface is performed based on the two detected opposite edges.

3. The method according to claim 1, further comprising:
capturing a further image with the image capturing device located at a succeeding location,
processing the captured further image to put together image data related to the reflected receiver tube,
determining the succeeding location of the image capturing device,
determining two positions (f, r) on the reflector surface based on the determined succeeding location, and the image data for the further image, and
calculating the reflector parameter at matching positions (f, r) on the reflector surface, where the matching positions (f, r) are determined from respective ones of the captured image and the captured further image.

4. The method according to claim 1, wherein the reflector parameter is calculated simultaneously for each of the determined two positions (f, r).

5. The method according to claim 2, further comprising verifying a partial surface of the reflector surface based on the calculated reflector parameter at a plurality of determined positions (f, r) within the partial surface.

6. The method according to claim 1, further comprising determining an angular error ($\varepsilon$, $\rho$) of the image capturing device's focus direction, wherein: a reference image of a reference object is captured with the image capturing device located at a reference location, the reference object comprising an elongated structure,
a reference edge of the elongated structure is detected in the reference image, and
calculating the angular error ($\varepsilon$, $\rho$) based on the detected reference edge and the reference location,
wherein the calculated angular error ($\varepsilon$, $\rho$) is compensated for when calculating the reflector parameter.

7. The method according to claim 6, wherein the angular error ($\varepsilon$, $\rho$) relates to at least one of: a focus direction of the image capturing device, and a twist about the focus direction of the image capturing device.

8. An arrangement for determining a reflector parameter of a concentrating solar collector's reflector surface, the concentrating solar collector having a receiver tube arranged at the reflector surface's focus, the arrangement comprising:
an image capturing device configured to capture an image of the reflected receiver tube in the reflector surface, and process the captured image to put together image data related to the reflected receiver tube,
a location control unit configured to determine a location of the image capturing device at a capturing time of the captured image, and
a processing unit configured to determine two positions (f, r) on the reflector surface based on the determined location of the image capturing device and the image data put together, and calculate the reflector parameter at each of the two determined positions (f, r) based on the image data,
wherein the reflector parameter is a slope of the reflector surface and the reflector surface is in one piece.

9. The arrangement according to claim 8, wherein the image capturing device is configured to process the captured image by detecting two opposite edges of the reflected receiver tube in the captured image and put together the image data to represent the two detected opposite edges, and wherein the processing unit is configured to determine the two positions (f, r) on the reflector surface based on the two detected opposite edges, and calculate the reflector parameter at the two determined positions (f, r) on the reflector surface based on the two detected opposite edges.

10. The arrangement according to claim 8, wherein the image capturing device is configured to capture a further image when located at a succeeding location, and process the captured further image to put together image data related to the reflected receiver tube,
wherein the location control unit is configured to determine the succeeding location of the image capturing device, and
wherein the processing unit is configured to:
determine two positions (f, r) on the reflector surface based on the determined succeeding location and image data for the further image, and
calculate the reflector parameter at matching positions (f, r) on the reflector surface, where the matching positions (f, r) are determined from respective ones of the captured image and the captured further image.

11. The arrangement according to claim 8, wherein the reflector parameter is calculated simultaneously for each of the determined two positions.

12. The arrangement according to claim 8, wherein the processing unit is configured to verify a partial surface of the reflector surface based on the calculated reflector parameter at a plurality of determined positions (f, r) within the partial surface.

13. The arrangement according to claim 8, further comprising a reference object, and further configured to determine an angular error ($\varepsilon$, $\rho$) of the image capturing device's focus direction, by:
capturing a reference image of the reference object with the image capturing device located at a reference location, the reference object comprising an elongated structure,
detecting a reference edge of the elongated structure in the reference image with the image capturing device, and
calculating the angular error ($\varepsilon$, $\rho$) based on the detected reference edge and the reference location, with the processing unit,
such that the calculated angular error ($\varepsilon$, $\rho$) may be compensated for when calculating the reflector parameter with the processing unit.

14. The arrangement according to claim 13, wherein the processing unit is configured to calculate the angular error ($\varepsilon$, $\rho$) as relating to at least one of: a focus direction of the image capturing device, and a twist about the focus direction of the image capturing device.

15. The method according to claim 1, wherein putting together the image data related to the reflected receiver tube comprises detecting edges of the reflected receiver tube in the captured image and selecting a plurality of image points representing the detected edges of reflected receiver tube.

16. The method according to claim 1, wherein processing the captured image comprises detecting an edge of the reflected receiver tube in the captured image and putting together the image data to represent the detected edge, wherein determining the two positions (f, r) on the reflector surface is performed based on the detected edge of each of the two positions, and wherein calculating the reflector parameter at each of the two determined positions (f, r) on the reflector surface is performed based on the detected edge of each of the two positions.

17. The arrangement according to claim 8, wherein putting together the image data related to the reflected receiver tube comprises detecting edges of the reflected receiver tube in the captured image and selecting a plurality of image points representing the detected edges of reflected receiver tube.

18. The arrangement according to claim 8, wherein processing the captured image comprises detecting an edge of the reflected receiver tube in the captured image and putting together the image data to represent the detected edge, wherein determining the two positions (f, r) on the reflector surface is performed based on the detected edge of each of the two positions, and wherein calculating the reflector parameter at each of the two determined positions (f, r) on the reflector surface is performed based on the detected edge of each of the two positions.

19. A production line for manufacturing of Parabolic Trough solar Collectors, PTCs, comprising the arrangement according to claim 8, for verification of the slope of the reflector surface.

20. The method according to claim 1, wherein the calculating is used to verity a shape of the reflector surface.

\* \* \* \* \*